(12) United States Patent  
Yokono et al.

(10) Patent No.: US 9,856,802 B2
(45) Date of Patent: Jan. 2, 2018

(54) CONTROLLER FOR SUPERCHARGER-EQUIPPED INTERNAL COMBUSTION ENGINE

(71) Applicant: Mitsubishi Electric Corporation, Chiyoda-ku, Tokyo (JP)

(72) Inventors: Michihisa Yokono, Hyogo (JP); Hideki Hagari, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 190 days.

(21) Appl. No.: 14/955,181

(22) Filed: Dec. 1, 2015

(65) Prior Publication Data

US 2016/0377004 A1 Dec. 29, 2016

(30) Foreign Application Priority Data

Jun. 29, 2015 (JP) .................................. 2015-129496

(51) Int. Cl.
*F02D 41/00* (2006.01)
*F02B 37/18* (2006.01)
*F02D 41/14* (2006.01)
*F02D 41/18* (2006.01)

(52) U.S. Cl.
CPC .......... *F02D 41/0007* (2013.01); *F02B 37/18* (2013.01); *F02D 41/1448* (2013.01); *F02D 41/18* (2013.01); *F02D 2200/0402* (2013.01); *F02D 2200/0404* (2013.01); *F02D 2200/0406* (2013.01); *F02D 2200/602* (2013.01); *Y02T 10/144* (2013.01)

(58) Field of Classification Search
CPC ...... F02D 41/0007; F02D 15/02; F02D 41/26; F02D 41/1445; F02B 17/18
See application file for complete search history.

(56) References Cited

U.S. PATENT DOCUMENTS

| 7,305,967 | B1 | 12/2007 | Hagari et al. |
| 9,605,608 | B2 * | 3/2017 | Yokono ................. F02D 11/105 |
| 2015/0377156 | A1 * | 12/2015 | Hagari ................ F02D 41/0007 60/602 |

FOREIGN PATENT DOCUMENTS

JP 2008-057339 A 3/2008

* cited by examiner

*Primary Examiner* — Thomas Moulis
(74) *Attorney, Agent, or Firm* — Sughrue Mion, PLLC; Richard C. Turner

(57) ABSTRACT

There is provided a controller, for a supercharger-equipped internal combustion engine, that can accurately estimate a supercharging pressure, without providing a pressure sensor for detecting the supercharging pressure. In a controller for a supercharger-equipped internal combustion engine, a correction value for correcting a supercharging pressure estimation value is changed so that an effective opening area estimation value, estimated based on a supercharging pressure estimation value and the like, approaches a preliminarily set effective opening area default value corresponding to a throttle opening degree detection value.

11 Claims, 8 Drawing Sheets

CONTROLLER FOR SUPERCHARGER-EQUIPPED INTERNAL COMBUSTION ENGINE

INCORPORATION BY REFERENCE

The disclosure of Japanese Patent Application No. 2015-129496 filed on Jun. 29, 2015 including its specification, claims and drawings, is incorporated herein by reference in its entirety.

BACKGROUND OF THE INVENTION

The present invention relates to a controller whose control subject is an internal combustion engine equipped with a supercharger having a turbine provided in an exhaust path, a compressor that is provided at the upstream side of a throttle valve in an intake path and rotates integrally with the turbine, and a wastegate valve provided in a turbine bypass path, of the exhaust path, that bypasses the turbine.

DESCRIPTION OF THE RELATED ART

An after-mentioned technology disclosed in Japanese Patent Application No. JP-A-2008-57339, which has been applied by the present applicant, is known, although it is a control technology for an internal combustion engine equipped with no supercharger. In the technology disclosed in JP-A-2008-57339, there is utilized a flow rate calculation equation for a throttle-type flowmeter that can represent the flow rate characteristic of a throttle valve, and based on the amount of air that passes through the throttle valve, the respective air pressures at the upstream and downstream sides of the throttle valve, and the temperature of the air, the effective opening area of the throttle valve is estimated; then, based on the result of the estimation, the throttle opening degree is learned and reflected in the control of the throttle valve opening degree.

SUMMARY OF THE INVENTION

Meanwhile, with regard to the control of a supercharger-equipped internal combustion engine, it is important to detect a supercharging pressure, which is a pressure at a position, in the intake path, that is at the downstream side of the compressor and at the upstream side of the throttle valve. However, provision of a pressure sensor for detecting a supercharging pressure results in a cost hike. Accordingly, the present applicant has developed a method of accurately estimating a supercharging pressure without providing any pressure sensor for detecting the supercharging pressure. The present applicant thought that with regard to accurate estimation of a supercharging pressure, it is important to consider the flow rate characteristic of a throttle valve. However, in the technology disclosed in JP-A-2008-57339, it is assumed that a pressure sensor for detecting the pressure (atmospheric pressure) at a position that is at the upstream side of the throttle valve is provided; thus, the technology cannot be applied to the method of estimating a supercharging pressure without providing any pressure sensor for detecting the supercharging pressure.

The present invention has been implemented in order to solve the foregoing problems; the objective thereof is to provide a controller, for a supercharger-equipped internal combustion engine, that can accurately estimate a supercharging pressure.

A controller according to the present invention is a controller whose control subject is an internal combustion engine equipped with a supercharger having a turbine provided in an exhaust path, a compressor that is provided at the upstream side of a throttle valve in an intake path and rotates integrally with the turbine, and a wastegate valve provided in a turbine bypass path, of the exhaust path, that bypasses the turbine. The controller for a supercharger-equipped internal combustion engine includes a throttle opening degree detection unit that detects a throttle opening degree, which is an opening degree of the throttle valve; an intake air amount detection unit that detects an intake air amount of the internal combustion engine; an intake air temperature detection unit that detects an intake air temperature, which is a temperature of intake air of the internal combustion engine; a manifold pressure detection unit that detects a manifold pressure, which is a pressure in an intake manifold as the intake path situated at the downstream side of the throttle valve; a supercharging pressure estimation unit that estimates a supercharging pressure, which is a pressure in the intake path situated at the downstream side of the compressor and at the upstream side of the throttle valve; and an opening area estimation unit that estimates an effective opening area of the throttle valve, based on the supercharging pressure estimation value, the manifold pressure detection value, the intake air amount detection value, and the intake air temperature detection value. The supercharging pressure estimation unit changes a correction value for correcting the supercharging pressure estimation value so that the effective opening area estimation value approaches a preliminarily set effective opening area default value corresponding to the throttle opening degree detection value, and adopts a value corrected by the correction value, as a final supercharging pressure estimation value.

The controller for a supercharger-equipped internal combustion engine according to the present invention estimates an effective opening area of the throttle valve, based on a supercharging pressure estimation value, a manifold pressure detection value, an intake air amount detection value, and an intake air temperature detection value. Based on the characteristic of the relationship between the throttle opening degree and the effective opening area default value, an estimation error in the effective opening area estimation value is determined, so that an estimation error in the supercharging pressure estimation value utilized for estimating the effective opening area can be corrected. Therefore, the supercharging pressure can accurately be estimated without providing any pressure sensor for detecting a supercharging pressure.

The foregoing and other object, features, aspects, and advantages of the present invention will become more apparent from the following detailed description of the present invention when taken in conjunction with the accompanying drawings.

DETAILED DESCRIPTION OF THE PREFERRRED EMBODIMENTS

Embodiment 1

Figure 1:
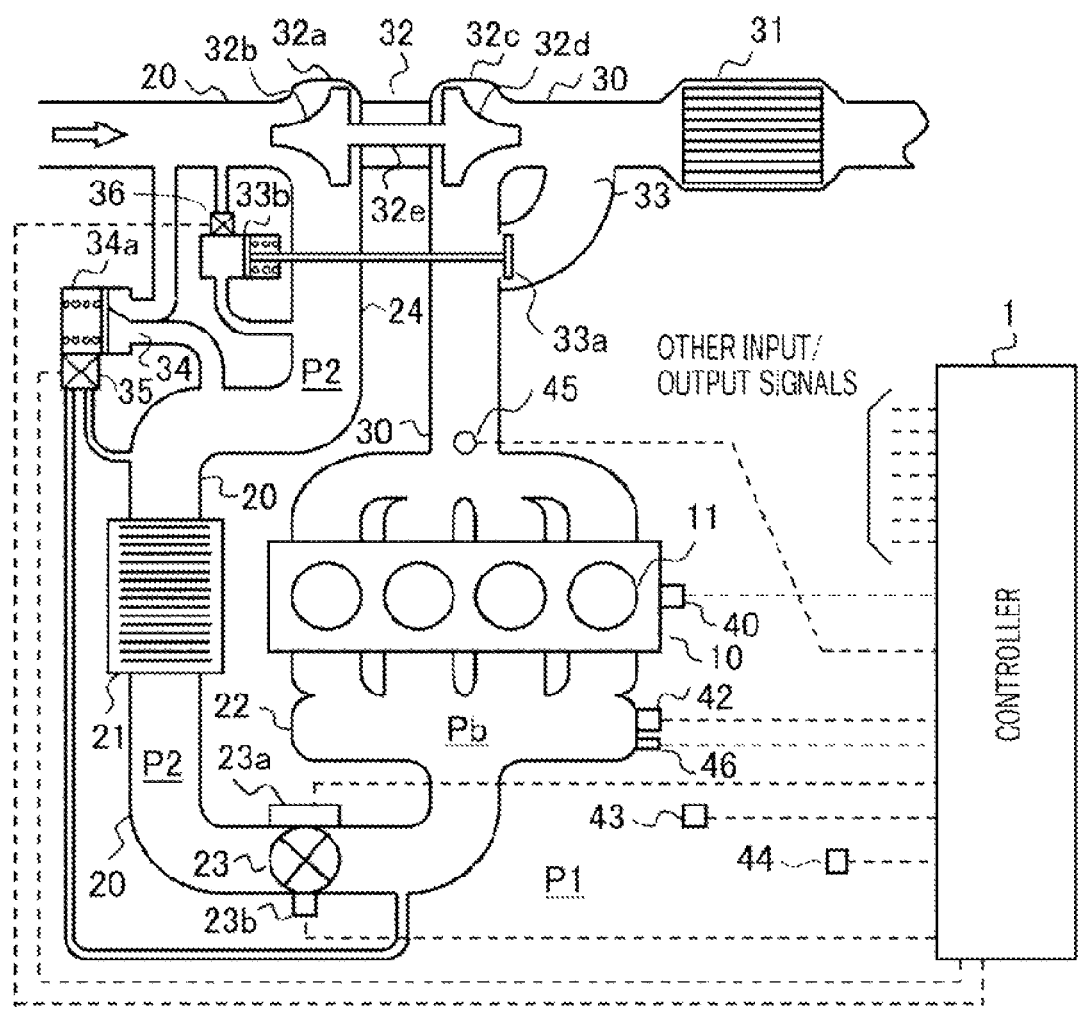
FIG. 1 is a schematic configuration diagram of a supercharger-equipped internal combustion engine and a controller thereof according to Embodiment 1 of the present invention.
Figure 2:
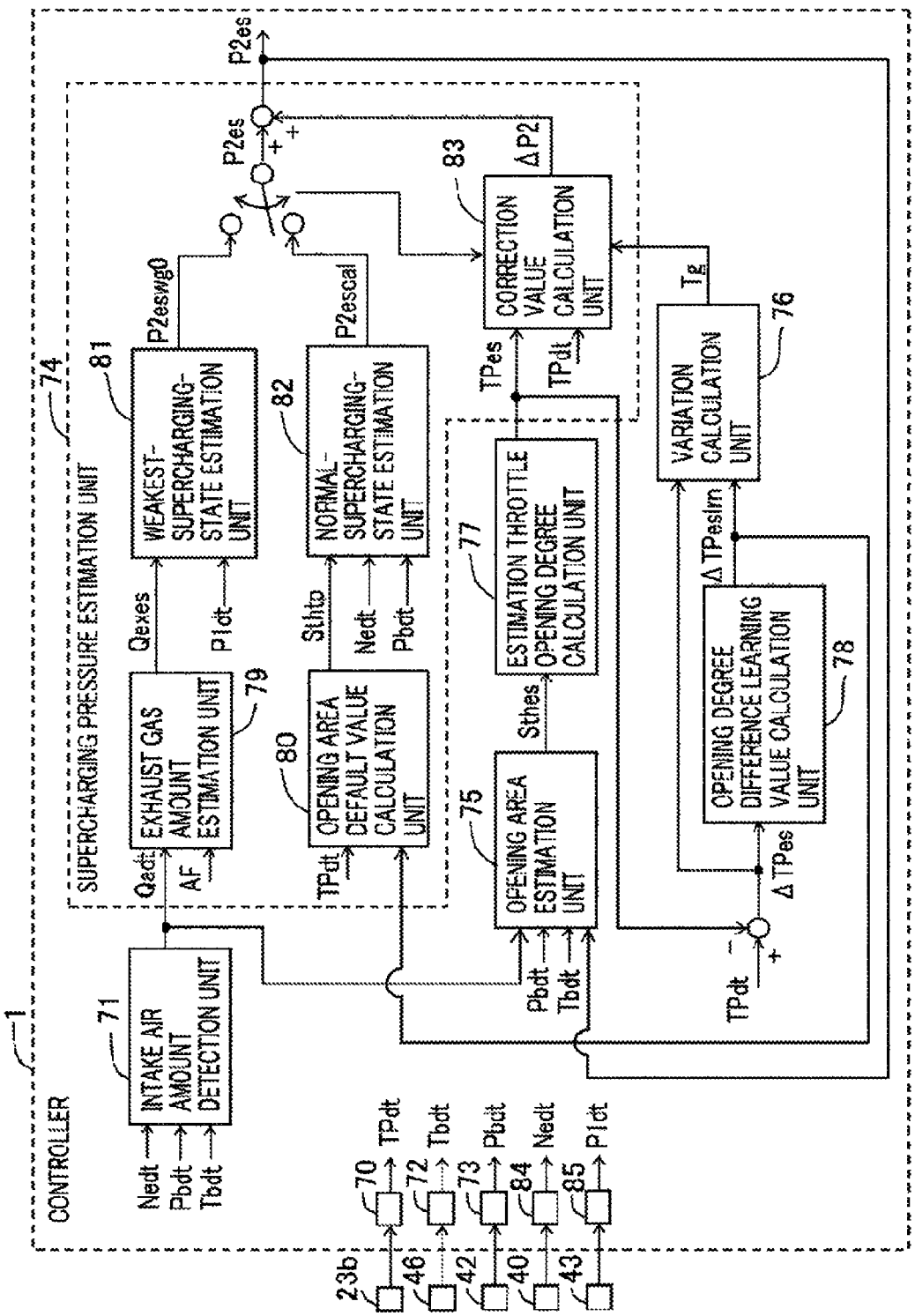
FIG. 2 is a block diagram of the controller for the supercharger-equipped internal combustion engine according to Embodiment 1 of the present invention.

A controller 1 for an internal combustion engine 10 equipped with a supercharger 32 (hereinafter, referred to simply as the controller 1) according to Embodiment 1 will be explained with reference to drawings. FIG. 1 is a schematic configuration diagram of the controller 1 and the internal combustion engine 10 equipped with the supercharger 32; FIG. 2 is a block diagram of the controller 1 according to Embodiment 1.

At first, the configuration of the internal combustion engine 10 equipped with the supercharger 32 (hereinafter, referred to simply as the internal combustion engine 10) will be explained. The internal combustion engine 10 has a plurality of combustion chambers 11. The internal combustion engine 10 has an intake path 20 for supplying air to the combustion chambers 11 and an exhaust path 30 for discharging exhaust gas from the combustion chambers 11. The intake path 20 has an intake manifold 22 for supplying air to the respective combustion chambers 11. A throttle valve 23 is provided at a position, in the intake path 20, that is at the upstream side of the intake manifold 22. The internal combustion engine 10 has the supercharger 32. The supercharger 32 has a turbine 32d provided in the exhaust path 30, a compressor 32b that is provided at the upstream side of the throttle valve 23 in the intake path 20 and rotates integrally with the turbine 32d, and a wastegate valve 33a that is provided at a position in a turbine bypass path 33, of the exhaust path 30, that bypasses the turbine 32d.

In the exhaust path 30, there are provided a turbine housing 32c that contains the turbine 32d and the turbine bypass path 33 that connects the upstream portion of the turbine housing 32c with the downstream portion thereof so that the turbine 32d is bypassed. The wastegate valve 33a is provided in the turbine bypass path 33. In the internal combustion engine 10, there is provided a wastegate actuator 33b that varies the opening degree of the wastegate valve 33a so as to adjust the flow path area of the turbine bypass path 33. A catalyst 31 is provided at the downstream side of the connection portions where the turbine bypass path 33 is connected with the exhaust path 30.

The wastegate actuator 33b is a positive-pressure actuator where a diaphragm is utilized. The pressure chamber of the diaphragm is connected to the intake path 20 (hereinafter, referred to as a supercharging intake path 24) that is at the downstream side of the compressor 32b and at the upstream side of the throttle valve 23; when due to supercharging, the pressure (a supercharging pressure P2) in the supercharging intake path 24 becomes higher than the atmospheric pressure P1, the wastegate actuator 33b can actuate the wastegate valve 33a. In the wastegate actuator 33b, there is provided a relief valve for adjusting the opening degree of a relief path that connects the pressure chamber of the diaphragm with the intake path 20 at the upstream side of the compressor 32b; the relief amount (the falling amount) of the pressure in the pressure chamber varies in accordance with the opening degree of the relief valve 36. The relief valve 36 is a solenoid valve that is controlled by the controller 1. The controller 1 makes the relief valve 36 adjust the relief amount; the pressure in the pressure chamber of the diaphragm to which the supercharging pressure P2 is supplied is adjusted; then, the opening degree of the wastegate valve 33a that operates in conjunction with the diaphragm is adjusted. As Embodiment 1, in general, neither the wastegate actuator 33b nor the wastegate valve 33a is equipped with a detector for detecting the operating amount thereof. Accordingly, by utilizing the detection value of the pressure such as the manifold pressure Pb in the intake path 20 at the downstream side of the compressor 32b, the control amount for the wastegate actuator 33b (relief valve 36) is adjusted. In the pressure state at a time before the wastegate actuator 33b can start to operate, i.e., in the state where the supercharging pressure P2 has not exceeded the atmospheric pressure P1, a mechanical element such as a spring contained in the wastegate actuator 33b holds the wastegate valve 33a at the full-closure position.

In the intake path 20, there are provided a compressor housing 32a for containing the compressor 32b and a compressor bypass path 34 for connecting the intake path 20 at the upstream side of the compressor housing 32a with the intake path 20 at the downstream side of the compressor housing 32a so as to bypass the compressor 32b. In the compressor bypass path 34, there is provided an air bypass valve 34a that opens or closes the flow path of the compressor bypass path 34. In the intake path 20, an intercooler 21 is provided at the downstream side of the compressor housing 32a, and the throttle valve 23 is provided at the downstream side of the intercooler 21.

The throttle valve 23 is opened or closed by a throttle motor (a motor for driving the throttle valve) 23a. The opening degree of the throttle valve 23 is detected by a throttle position sensor 23b.

The intake manifold 22 is equipped with a manifold pressure sensor 42 for detecting the manifold pressure Pb, which is the pressure of intake air in the intake manifold 22, and an intake air temperature sensor 46 for detecting an intake air temperature Tb, which is the temperature of intake air in the intake manifold 22.

In the exhaust path 30, there is provided an A/F sensor 45 for detecting an air-fuel (Air/Fuel) ratio AF, which is the ratio of air to fuel in exhaust gas. An atmospheric pressure sensor 43 for detecting the atmospheric pressure P1 is provided outside the internal combustion engine 10. In addition, the controller 1 may be configured in such a way that the atmospheric pressure sensor 43 is not provided and that based on a manifold pressure detection value Pbdt detected by the manifold pressure sensor 42, the atmospheric pressure P1 is estimated while considering the driving state.

The configuration of the supercharger 32 will be explained. A centrifugal turbine is formed of the turbine housing 32c and the turbine 32d that is provided inside the turbine housing 32 and functions as a turbine wheel having a plurality of blades. A centrifugal compressor is formed of the compressor housing 32a and the compressor 32b that is provided inside the compressor housing 32a and functions as a compressor wheel having a plurality of blades. The turbine 32d and the compressor 32b are coupled with each other by a turbine shaft 32e in such a way as to integrally rotate on the same axis. Therefore, when exhaust gas drives and rotates the turbine 32d, the compressor 32b rotates at the same rotation speed as the turbine 32d; then, the internal combustion engine 10 is supercharged with the air from the intake path 20. As described above, the supercharger 32 is formed of the centrifugal turbine (32c, 32d) and the centrifugal compressor (32a, 32b).

As the air bypass valve 34a, a diaphragm is utilized. A diaphragm is activated by the pressure difference between the supercharging pressure P2 and the manifold pressure Pb. When the supercharging pressure P2 increases to exceed a predetermined pressure difference from the manifold pressure Pb, the diaphragm is activated and hence the air bypass valve 34a is opened; thus, the upstream side and the downstream side of the compressor 32b are connected. Accordingly, it is made possible to prevent mechanical damage caused by an abnormal rise of the supercharging pressure P2. The air bypass valve 34a is provided with a switching valve 35. The switching valve 35 can switch over the manifold pressure Pb supplied to the air bypass valve 34a to the supercharging pressure P2. The switching valve 35 is a solenoid valve that is controlled by the controller 1. Therefore, the controller 1 can control the operation timing of the air bypass valve 34a. In the pressure state at a time before the air bypass valve 34a can start to operate, i.e., in the state where the pressure difference supplied to the diaphragm is small, the air bypass valve 34a is held at the full-closure position by the mechanical element such as a spring contained in the air bypass valve 34a.

Figure 11:
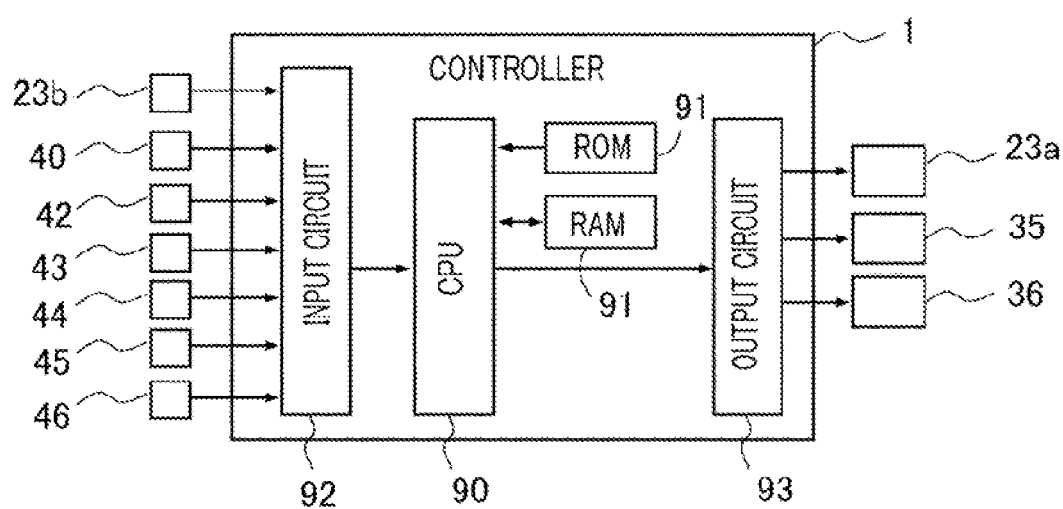
FIG. 11 is a hardware configuration diagram of the controller for the supercharger-equipped internal combustion engine according to Embodiment 1 of the present invention.

Next, the controller 1 will be explained. The controller is a controller whose control subject is the internal combustion engine 10 equipped with the supercharger 32. Respective control units 70 through 85 and the like provided in the controller 1 are realized by a processing circuit included in the controller 1. Specifically, as illustrated in FIG. 11, the controller 1 includes, as a processing circuit, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like. As the storage apparatuses 91, there are provided a RAM (Random Access Memory) that can read data and write data from the computing processing unit 90, a ROM (Read Only Memory) that can read data from the computing processing unit 90, and the like. The input circuit 92 is connected with various kinds of sensors and switches and is provided with an A/D converter and the like for inputting output signals from the sensors and the switches to the computing processing unit 90. The output circuit 93 is connected with electric loads and is provided with a driving circuit and the like for outputting a control signal to the electric loads from the computing processing unit 90. In addition, the computing processing unit 90 runs software items (programs) stored in the storage apparatus 91 such as a ROM and collaborates with other hardware devices in the controller 1, such as the storage apparatus 91, the input circuit 92, and the output circuit 93, so that the respective functions of the control units 70 through 85 included in the controller 1 are realized.

In Embodiment 1, the input circuit 92 is connected with the throttle position sensor 23b, a crank rotation speed sensor 40, the manifold pressure sensor 42, the atmospheric pressure sensor 43, an accelerator position sensor 44, the A/F sensor 45, the intake air temperature sensor 46, and the like. The output circuit 93 is connected with the throttle motor 23a, the switching valve 35 for the air bypass valve 34a, the relief valve 36 for the wastegate actuator 33b, and the like. The controller 1 is connected with various kinds of unillustrated sensors, switches, actuators, and the like.

As basic control, the controller 1 calculates the fuel injection amount and the ignition timing, based on inputted output signals and the like from the various kinds of sensors so as to perform driving control of a fuel ignition apparatus, an ignition apparatus, and the like (unillustrated). Based on the output signal of the accelerator position sensor 44 and the like, the controller 1 calculates the output torque of the internal combustion engine 10, demanded by the driver, and then controls the throttle valve 23, the wastegate valve 33a, and the like so that an intake air amount Qa for realizing the demanded output torque is obtained. Specifically, the controller 1 calculates a desired throttle opening degree and then performs driving control of the throttle motor 23a so that a detection value TPdt of the throttle opening degree, detected based on the output signal of the throttle position sensor 23b, approaches the desired throttle opening degree.

While controlling the throttle opening degree TP, the controller 1 controls the driving signal for the wastegate actuator 33b (relief valve 36) so that the opening degree of the wastegate valve 33a becomes a desired opening degree. Specifically, the controller 1 performs duty driving of the relief valve 36, as a solenoid valve, and increases or decreases the duty ratio so as to increases or decreases the relief amount (falling amount) of the supercharging pressure P2 of the air to be supplied to the pressure chamber of the wastegate actuator 33b. In the case where the relief valve 36 is controlled to be fully closed so that the relief amount is made minimum, the pressure in the pressure chamber becomes maximum in the control range of the relief valve 36 and the opening degree of the wastegate valve 33a becomes maximum in the control range thereof. Accordingly, the exhaust gas amount Qex that bypasses the turbine 32d becomes maximum and hence the exhaust gas amount Qex that is supplied to the turbine 32d becomes minimum. As a result, there occurs a driving state in which supercharging is weakened at most. In contrast, in the case where the relief valve 36 is controlled to be fully opened so that the relief amount is made maximum, the pressure in the pressure chamber becomes minimum in the control range of the relief valve 36 and the opening degree of the wastegate valve 33a becomes minimum in the control range thereof. Accordingly, the exhaust gas amount Qex that bypasses the turbine 32d becomes minimum and hence the exhaust gas amount Qex that is supplied to the turbine 32d becomes maximum. As a result, there occurs a driving state in which supercharging is strengthened at most.

The controller 1 is provided with a throttle opening degree detection unit 70. The throttle opening degree detection unit 70 detects the throttle opening degree TP, which is the opening degree of the throttle valve 23. The throttle opening degree detection unit 70 detects the throttle opening degree TP, based on the output signal of the throttle position sensor 23b.

The controller 1 is provided with an intake air amount detection unit 71. The intake air amount detection unit 71 detects the intake air amount Qa of the internal combustion engine 10. In Embodiment 1, the intake air amount detection unit 71 is a so-called D-Jetronic type in which based on the manifold pressure detection value Pbdt, the rotation speed detection value Nedt of the internal combustion engine 10, and the intake air temperature detection value Tbdt, the intake air amount Qa is detected. It may be allowed that the intake air amount detection unit 71 is a so-called L-Jetronic type in which based on the output signal of an air flow sensor provided in the intake path 20, the intake air amount Qa is detected.

The controller 1 is provided with an intake air temperature detection unit 72. The intake air temperature detection unit 72 detects the intake air temperature Tb, which is the temperature of intake air in the internal combustion engine 10. The intake air temperature detection unit 72 detects the intake air temperature Tb, based on the output signal of the intake air temperature sensor 46, which is inputted to the controller 1.

The controller 1 is provided with a manifold pressure detection unit 73. The manifold pressure detection unit 73 detects the manifold pressure Pb, which is the pressure in the intake manifold 22 as the intake path 20 at the downstream side of the throttle valve 23. The manifold pressure detection unit 73 detects the manifold pressure Pb, based on the output signal of the manifold pressure sensor 42.

The controller 1 is provided with a supercharging pressure estimation unit 74. The supercharging pressure estimation unit 74 estimates the supercharging pressure P2, which is the pressure in the intake path 20 (supercharging intake path 24) that is situated at the downstream side of the compressor 32b and at the upstream side of the throttle valve 23. The method of estimating the supercharging pressure P2, according to Embodiment 1, will be described later. The controller 1 is utilized in various kinds of control items such as the control in which based on a supercharging pressure estimation value P2es estimated by the supercharging pressure estimation unit 74, the control amount for the wastegate actuator 33b (relief valve 36) is set and the desired throttle opening degree for realizing a desired intake air amount is set.

The controller 1 is provided with an opening area estimation unit 75. The opening area estimation unit 75 estimates an effective opening area Sth of the throttle valve 23, based on the supercharging pressure estimation value P2es, the manifold pressure detection value Pbdt, an intake air amount detection value Qadt, and the intake air temperature detection value Tbdt.

In Embodiment 1, the opening area estimation unit 75 estimates the effective opening area Sth by use of the flow-rate-calculation theoretical formula, for a throttle-type flowmeter, that is given by the equation (1) and that can represent the flow rate characteristic of the throttle valve 23. The effective opening area Sth corresponds to the value obtained by multiplying the opening area of the throttle valve 23 by a flow rate coefficient.

$$Qa = a0 \cdot Sth \cdot \sqrt{\frac{2}{\kappa-1}\left[\left(\frac{Pb}{P2}\right)^{\frac{2}{\kappa}} - \left(\frac{Pb}{P2}\right)^{\frac{\kappa+1}{\kappa}}\right]} \quad (1)$$

where the intake air amount Qa is the volume flow rate [L/s] of intake air, a0 is the sonic velocity [m/s] of intake air, and κ is the specific heat ratio of intake air.

Figure 3:
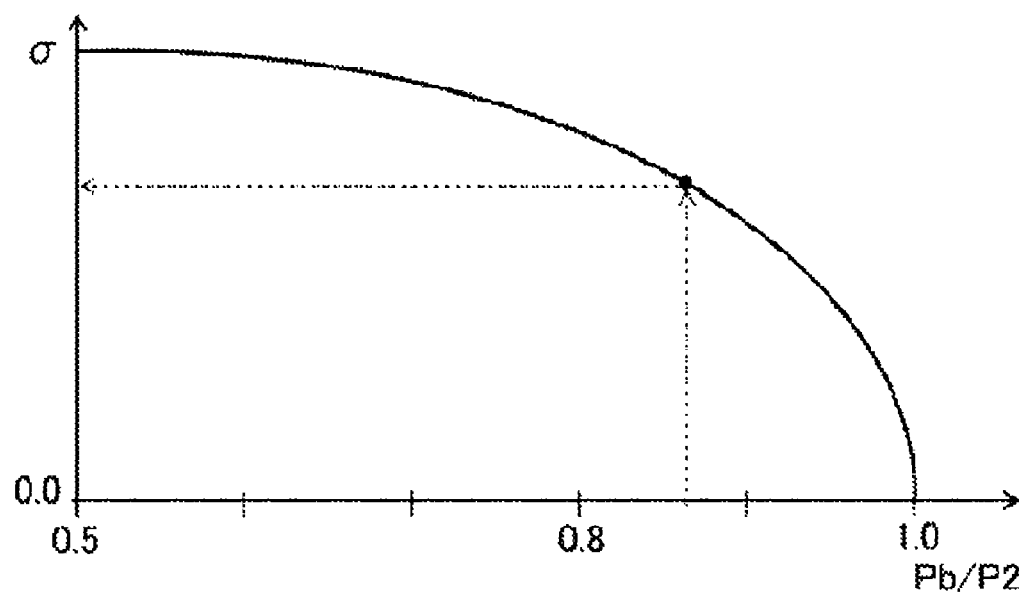
FIG. 3 is a graph representing the relationship between the pressure ratio and the dimensionless flow rate according to Embodiment 1 of the present invention.

The equation (2) is obtained by rearranging the equation (1) with regard to the effective opening area Sth.

$$Sth = \frac{Qa}{a0 \cdot \sigma} \quad (2)$$

$$\sigma = \sqrt{\frac{2}{\kappa-1}\left[\left(\frac{Pb}{P2}\right)^{\frac{2}{\kappa}} - \left(\frac{Pb}{P2}\right)^{\frac{\kappa+1}{\kappa}}\right]} = f\left(\frac{Pb}{P2}\right)$$

where σ is a dimensionless flow rate that varies in accordance with the pressure ratio Pb/P2. The dimensionless flow rate σ becomes a constant value, i.e., the dimensionless flow rate σ at a time of the critical pressure ratio, when the pressure ratio Pb/P2 is the same as or smaller than the critical pressure ratio (approximately 0.528, in the case of air). The opening area estimation unit 75 calculates the dimensionless flow rate σ corresponding to the pressure ratio Pb/P2 calculated by dividing the manifold pressure detection value Pbdt by the supercharging pressure estimation value P2es, by use of a dimensionless flow rate map, as represented in FIG. 3, in which the relationship between the pressure ratio Pb/P2 and the dimensionless flow rate σ is preliminarily set in accordance with the equation (2). Then, the opening area estimation unit calculates, as the effective opening area estimation value Sthes, a value to be obtained by dividing the intake air amount detection value Qadt by the multiplication product of the sonic velocity a0 and the dimensionless flow rate σ. By use of the sonic-velocity-calculation theoretical formula given by the equation (3), the opening area estimation unit 75 calculates the sonic velocity a0, based on the intake air temperature detection value Tbdt. By use of a sonic velocity constant map, which is a map in which the relationship between the intake air temperature Tb and the sonic velocity a0 is preliminarily set in accordance with the equation (3), the opening area estimation unit 75 calculates the sonic velocity a0 corresponding to the intake air temperature detection value Tbdt.

$$a0 = \kappa \cdot R \cdot Tb \quad (3)$$

where R is a gas constant.

As described above, the opening area estimation unit 75 calculates the effective opening area estimation value Sthes, based on the supercharging pressure estimation value P2es and the like. However, if there exists an error in the supercharging pressure estimation value P2es, an error is caused in the effective opening area estimation value Sthes.

Figure 4:
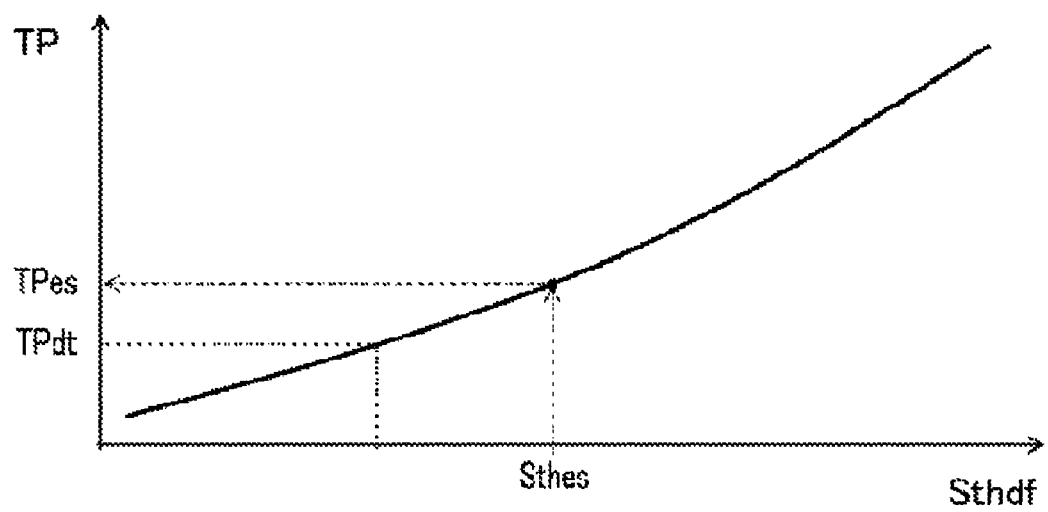
FIG. 4 is a graph representing the relationship between the throttle opening degree and the default value of an effective opening area according to Embodiment 1 of the present invention.

Meanwhile, the relationship between the throttle opening degree TP and the effective opening area default value Sthdf, represented in FIG. 4, can be preliminarily determined by an experiment or the like. Specifically, the foregoing relationship can be preliminarily determined by an experiment, based on the effective opening area Sth calculated in accordance with the equation (2) and by use of the measurement values obtained by measurement devices such as the supercharging pressure P2 and the manifold pressure Pb measured by the pressure sensor, the intake air amount Qa measured by the flow rate sensor, and the intake air temperature Tb measured by the temperature sensor and the throttle opening degree TP at a time of the measurement. The effective opening area Sth that is preliminarily determined by an experiment or the like and set in such a manner as described above is referred to as the effective opening area default value Sthdf. In general, the effective opening area default value Sthdf is measured by use of the throttle valve 23 that is middle in the variation range of the production thereof. Whether or not there exists an error in the supercharging pressure estimation value P2es can be determined by whether or not there exists a difference between the effective opening area estimation value Sthes estimated based on the supercharging pressure estimation value P2es and the like and the effective opening area default value Sthdf corresponding to the throttle opening degree detection value TPdt. Then, the supercharging pressure estimation value P2es is corrected in such a way that the effective opening area estimation value Sthes approaches the effective opening area default value Sthdf, so that the estimation error in the supercharging pressure estimation value P2es can be reduced.

Thus, in the supercharging pressure estimation unit 74, a correction value ΔP2 for correcting the supercharging pressure estimation value P2es is changed so that the effective opening area estimation value Sthes approaches the effective opening area default value Sthdf that corresponds to the throttle opening degree detection value TPdt and is preliminarily set, and the value corrected by the correction value ΔP2 is adopted as the final supercharging pressure estimation value P2es (P2es←P2es+ΔP2). In Embodiment 1, the supercharging pressure estimation unit 74 is provided with a correction value calculation unit 83 for calculating the correction value ΔP2.

This configuration makes it possible that on the basis of the characteristic of the relationship between the throttle opening degree TP and the effective opening area default value Sthdf, an estimation error in the effective opening area estimation value Sthes estimated based on the supercharging pressure estimation value P2es is determined so that the estimation error in the supercharging pressure estimation value P2es utilized for calculation of the effective opening area estimation value Sthes is corrected.

The correction value calculation unit 83 increases the corrected supercharging pressure estimation value P2es by increasing the correction value ΔP2 when the effective opening area estimation value Sthes is larger than the effective opening area default value Sthdf, and decreases the corrected supercharging pressure estimation value P2es by decreasing the correction value ΔP2 when the effective opening area estimation value Sthes is smaller than the effective opening area default value Sthdf.

In the case where the effective opening area estimation value Sthes is larger than the effective opening area default value Sthdf, it is conceivable from the equation (2) that the dimensionless flow rate σ is smaller than its correct value, assuming that the intake air amount detection value Qadt and the sonic velocity a0 are correct. In the case where the dimensionless flow rate σ is smaller than its correct value, it is conceivable from FIG. 3 that the pressure ratio Pb/P2 is larger than its correct value; therefore, assuming that the manifold pressure detection value Pbdt is correct, it is conceivable that the supercharging pressure estimation value P2es is smaller than it correct value. Thus, as the foregoing configuration, in the case where the effective opening area estimation value Sthes is larger than the effective opening area default value Sthdf, the corrected supercharging pressure estimation value P2es is increased by increasing the correction value ΔP2, so that the estimation error in the supercharging pressure estimation value P2es can be reduced. In contrast, in the case where the effective opening area estimation value Sthes is smaller than the effective opening area default value Sthdf, it is conceivable that the supercharging pressure estimation value P2es is larger than its correct value. Accordingly, in the foregoing configuration, the estimation error in the supercharging pressure estimation value P2es can be reduced by decreasing the correction value ΔP2 so as to decrease the corrected supercharging pressure estimation value P2es.

In Embodiment 1, the controller 1 is provided with an estimation throttle opening degree calculation unit 77. By use of an opening area default value map, as represented in FIG. 4, in which the relationship between the throttle opening degree TP and the effective opening area default value Sthdf is preliminarily set, the estimation throttle opening degree calculation unit 77 calculates an estimation throttle opening degree TPes, which is the throttle opening degree TP corresponding to the effective opening area estimation value Sthes. Then, the correction value calculation unit 83 changes the correction value ΔP2 so that the estimation throttle opening degree TPes approaches the throttle opening degree detection value TPdt.

As described above, the effective opening area estimation value Sthes estimated based on the supercharging pressure estimation value P2es and the like is converted into the estimation throttle opening degree TPes, which is the corresponding throttle opening degree, by use of the opening area default value map in which the relationship between the throttle opening degree TP and the effective opening area default value Sthdf is preliminarily set; the correction value ΔP2 is changed so that the estimation throttle opening degree TPes approaches the throttle opening degree detection value TPdt. As a result, the supercharging pressure estimation value P2es can be corrected so that the effective opening area estimation value Sthes approaches the effective opening area default value Sthdf corresponding to the throttle opening degree detection value TPdt. In other words, an estimation error in the effective opening area Sth is converted into an error based on the throttle opening degree by use of the opening area default value map and is utilized in processing a change in the correction value ΔP2.

The correction value calculation unit 83 increases the corrected supercharging pressure estimation value P2es by increasing the correction value ΔP2 when the throttle opening degree detection value TPdt is smaller than the estimation throttle opening degree TPes, and decreases the corrected supercharging pressure estimation value P2es by decreasing the correction value ΔP2 when the throttle opening degree detection value TPdt is larger than the estimation throttle opening degree TPes.

As represented in FIG. 4, when the effective opening area estimation value Sthes is larger than the effective opening area default value Sthdf, the throttle opening degree detection value TPdt becomes smaller than the estimation throttle opening degree TPes. In addition, in the case where the effective opening area estimation value Sthes is larger than the effective opening area default value Sthdf, it is conceivable, as described above, that the supercharging pressure estimation value P2es is smaller than its correct value. Thus, in the foregoing configuration, in the case where the throttle opening degree detection value TPdt is smaller than the estimation throttle opening degree TPes, the corrected supercharging pressure estimation value P2es is increased by increasing the correction value ΔP2, so that the estimation error in the supercharging pressure estimation value P2es can be reduced. In contrast, in the case where the throttle opening degree detection value TPdt is larger than the estimation throttle opening degree TPes, it is conceivable that supercharging pressure estimation value P2es is larger than its correct value; therefore, as in the foregoing configuration, the estimation error in the supercharging pressure estimation value P2es can be reduced by decreasing the correction value ΔP2 so as to decrease the corrected supercharging pressure estimation value P2es.

In Embodiment 1, the correction value calculation unit 83 increases or decreases the correction value ΔP2 by a preliminarily set changing amount P2chg.

$$\Delta P2(n)=\Delta P2(n-1)+P2chg \text{ or } \Delta P2(n)=\Delta P2(n-1)-P2chg$$

where (n) denotes the value in the present calculation cycle, and (n−1) denotes the value in the immediately previous calculation cycle.

In order to prevent the correction value ΔP2 from changing in a rapid and abrupt manner, the changing amount P2chg is set to a value that is the same as or smaller than 1 [kPa], although depending on the setting of the calculation cycle.

Figure 5:
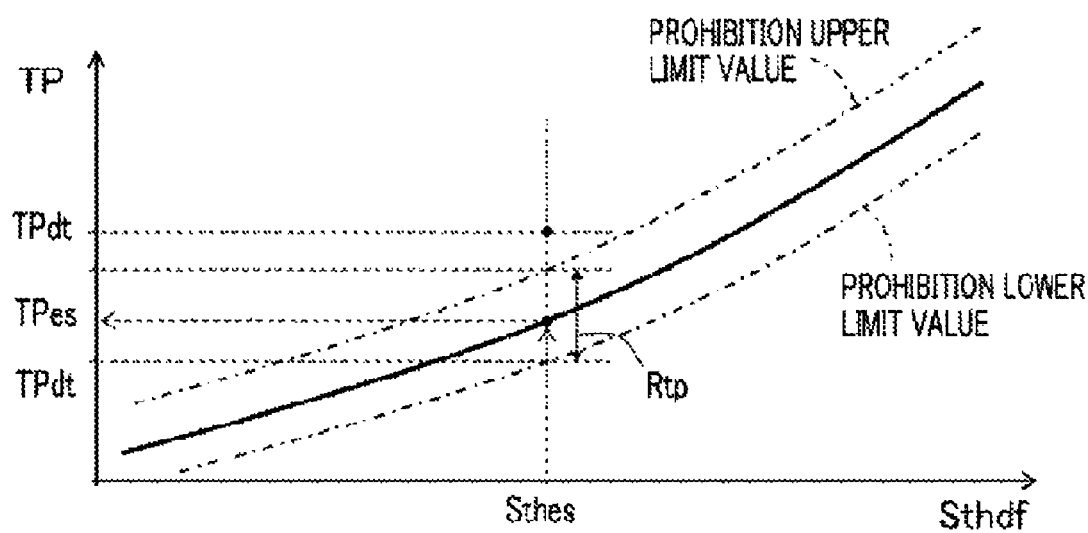
FIG. 5 is a graph for explaining prohibition or permission of a change in the correction value according to Embodiment 1 of the present invention.

In Embodiment 1, as represented in FIG. 5, the correction value calculation unit 83 permits the correction value ΔP2 to change when the throttle opening degree detection value TPdt is out of a preliminarily set prohibition opening degree range Rtp including the estimation throttle opening degree TPes, and prohibits the correction value ΔP2 from changing when the throttle opening degree detection value TPdt is within the prohibition opening degree range Rtp.

In the case where the difference between the throttle opening degree detection value TPdt and the estimation throttle opening degree TPes is large, it can be determined that the difference is caused not by a fluctuation in the flow rate characteristic (the relationship between the throttle opening degree TP and the effective opening area Sth) of the throttle valve 23 due to the valve difference resulted from production variations, aging deterioration, or the like of the throttle valve 23 but by an error in the supercharging pressure estimation value P2es. The width of the fluctuation in the flow rate characteristic of the throttle valve 23, caused by production variations, aging deterioration, or the like, can preliminarily be set based on the tolerances, actually measured values, or the like; therefore, the prohibition opening degree range Rtp can preliminarily be set by considering the width of the fluctuation caused by production variations, aging deterioration, or the like. Accordingly, when the throttle opening degree detection value TPdt is out of the prohibition opening degree range Rtp, it is determined that an estimation error exists in the supercharging pressure estimation value P2es and the correction value ΔP2 is permitted to change, and when the throttle opening degree detection value TPdt is within the prohibition opening degree range Rtp, it is determined that a fluctuation exists in the flow rate characteristic of the throttle valve 23 and the correction value ΔP2 is prohibited from changing; as a result, the accuracy of correcting the supercharging pressure P2 can be raised.

In Embodiment 1, as represented in FIG. 5, the correction value calculation unit 83 sets, as the prohibition opening degree range Rtp, a prohibition upper limit value to be obtained by adding a preliminarily set value to the estimation throttle opening degree TPes and a prohibition lower limit value to be obtained by subtracting a preliminarily set value from the estimation throttle opening degree TPes.

Then, the correction value calculation unit 83 prohibits the correction value ΔP2 from changing when the throttle opening degree detection value TPdt is between the prohibition upper limit value and the prohibition lower limit value, and permits the correction value ΔP2 to change when the throttle opening degree detection value TPdt is larger than the prohibition upper limit value or smaller than the prohibition lower limit value.

On the other hand, in order to more accurately determine whether the difference between the effective opening area estimation value Sthes and the effective opening area default value Sthdf corresponding to the throttle opening degree detection value TPdt is caused by an estimation error in the supercharging pressure estimation value P2es or by a fluctuation of the flow rate characteristic of the throttle valve 23 from the default value thereof, the controller 1 performs a variation determination, explained below.

In other words, the controller 1 is provided with a variation calculation unit 76. The variation calculation unit calculates the variation degree of the estimation opening area difference, to the average value thereof, that is the difference between the effective opening area estimation value Sthes and the default value Sthdf of the effective opening area Sth corresponding to the throttle opening degree detection value TPdt. The supercharging pressure estimation unit 74 permits the correction value ΔP2 to change when the variation degree is the same as or larger than a preliminarily set determination degree, and prohibits the correction value ΔP2 from changing when the variation degree is smaller than the preliminarily set determination degree.

Because the flow rate characteristic of the throttle valve 23 fluctuates in an offset manner, the foregoing estimation opening area difference becomes an offset-like value when the flow rate characteristic of the throttle valve 23 fluctuates. Therefore, even when the operating points of the throttle opening degree TP, the manifold pressure Pb, the supercharging pressure P2, and the like change, the variation degree of the estimation opening area difference does not become so large. In contrast, when an offset-like error exists in the supercharging pressure estimation value P2es, the variation degree of the estimation opening area difference at a time when the operating points of the throttle opening degree TP, the manifold pressure Pb, the supercharging pressure P2, and the like change becomes large. This is because as given by the equation (2), the effective opening area estimation value Sthes is calculated by dividing the intake air amount Qa by the dimensionless flow rate σ, the gradient of which largely changes in accordance with the operating point of the pressure ratio Pb/P2, as represented in FIG. 3. Specifically, when the operating point of the pressure ratio Pb/P2 changes while the supercharging pressure estimation value P2es has differed in an offset manner from the correct supercharging pressure P2, the changing amount of the dimensionless flow rate σ from its correct value at a time no estimation error exists changes in accordance with the operating point of the pressure ratio Pb/P2 but not changes in an offset manner. As a result, the effective opening area estimation value Sthes changes in accordance with change of the pressure ratio Pb/P2 and hence the variation degree becomes large, as described above. Even when the supercharging pressure estimation value P2es differs in an offset manner, the variation degree does not become large as long as the pressure ratio Pb/P2 does not change.

Thus, in the foregoing configuration, in the case where the variation degree is the same as or larger than the determination degree and hence it can accurately be determined that there exists an estimation error in the supercharging pressure estimation value P2es, the correction value ΔP2 is permitted to change; therefore, the estimation error in the supercharging pressure P2 can accurately be corrected. In contrast, in the case where the variation degree is smaller than the determination degree, it is determined that there exists no estimation error in the supercharging pressure estimation value P2es or that it is not clear whether or not there exists an estimation error in the supercharging pressure estimation value P2es, and then the correction value ΔP2 is prohibited from changing; therefore, it is made possible to suppress the fluctuation in the flow rate characteristic of the throttle valve 23 from being corrected as an estimation error in the supercharging pressure estimation value P2es.

In Embodiment 1, the variation calculation unit 76 calculates the variation degree of an estimation throttle opening degree difference ΔTPes (=TPdt−TPes), which is the difference between the estimation throttle opening degree TPes and the throttle opening degree detection value TPdt, to the average value of the estimation throttle opening degree difference ΔTPes.

As described above, the estimation throttle opening degree TPes is calculated as the throttle opening degree corresponding to the effective opening area estimation value Sthes, by use of the opening area default value map representing the relationship between the throttle opening degree TP and the effective opening area default value Sthdf. Accordingly, by calculating the variation degree of the estimation throttle opening degree difference ΔTPes, which is the difference between the estimation throttle opening degree TPes and the throttle opening degree detection value TPdt, it is made possible to calculate the variation degree of the difference between the effective opening area estimation value Sthes and the default value Sthdf of the effective opening area Sth corresponding to the throttle opening degree detection value TPdt. In other words, after being converted the variation degree of the difference of the effective opening area Sth into the variation degree of the difference based on the throttle opening degree by use of the opening area default value map, the variation degree is determined.

The variation calculation unit 76 calculates the variance $s^2$ of the estimation throttle opening degree difference ΔTPes, as the variation degree. The variance $s^2$ is an evaluation index for the variation degree at a time when it is assumed that the variation of sample data pieces forms a normal distribution. The variation $s^2$ of N sample data pieces (X1, X2, - - - , XN) can be calculated by the equation (4).

$$s^2 = \frac{1}{N}\sum_{i=1}^{N}(xi - \bar{x})^2 \quad (4)$$

$$\bar{x} = \frac{1}{N}\sum_{i=1}^{N} xi$$

As described above, the variance $s^2$ is a value to be obtained by applying averaging processing to the squares of the differences between the respective sample data pieces (X1, X2, - - - , XN) and the average value of the sample data pieces. In Embodiment 1, the variation calculation unit 76 utilizes, as each of the sample data pieces, the estimation throttle opening degree difference ΔTPes and utilizes, as the average value of the respective sample date pieces, an estimation throttle opening degree difference learning value ΔTPeslrn, which, described later, is a value to be obtained by applying averaging processing to the estimation throttle opening degree difference ΔTPes. As given by the equations (5) and (6), the variation calculation unit 76 calculates, as a value corresponding to the variance $s^2$ obtained by applying averaging processing to the square of the error, a value Tg to be obtained by applying first-order lag filtering processing to the value Ts obtained by raising the difference between each of the sample data pieces and the average value of the respective sample data pieces to the second power. Specifically, as given by the equation (5), the variation calculation unit 76 raises the error between the estimation throttle opening degree difference ΔTPes and the estimation throttle opening degree difference learning value ΔTPeslrn to the second power so as to calculate the square value Ts of the error, and, as given by the equation (6), applies first-order lag filtering processing to the square value Ts of the error so as to calculate the variance Tg of the estimation throttle opening degree difference ΔTPes.

$$\Delta TPes(n) = TPdt(n) - TPes(n)$$

$$Ts(n) = \{\Delta TPes(n) - \Delta TPeslrn(n)\}^2 \quad (5)$$

$$Tg(n) = Kg \cdot Tg(n-1) + (1-Kg) \cdot Ts(n) \quad (6)$$

where (n) denotes the value in the present calculation cycle, and (n−1) denotes the value in the immediately previous calculation cycle. Kg denotes a filter gain in the first-order lag filtering processing and is preliminarily set to a value corresponding to the time constant. Instead of performing the first-order lag filtering processing, the variation calculation unit 76 may perform, for example, moving-average processing so as to calculate the variance Tg. In addition, the variation calculation unit 76 may calculate the standard deviation, which is the square root of the variance $s^2$, as the variation degree of the estimation throttle opening degree difference ΔTPes.

In Embodiment 1, the controller 1 is provided with an opening degree difference learning value calculation unit 78. The opening degree difference learning value calculation unit 78 calculates the estimation throttle opening degree difference learning value ΔTPeslrn, which is a value obtained by applying averaging processing to the estimation throttle opening degree difference ΔTPes, which is the difference between the estimation throttle opening degree TPes and the throttle opening degree detection value TPdt. As the averaging processing, various kinds of averaging processing items such as moving-average processing and first-order lag filtering processing can be utilized. In Embodiment 1, the opening degree difference learning value calculation unit 78 utilizes the desired throttle opening degree instead of the throttle opening degree detection value TPdt.

In addition, for the purpose of raising the correction accuracy for the supercharging pressure estimation value P2es, pressure ratio determination is performed as described below.

In other words, the supercharging pressure estimation unit 74 permits the correction value ΔP2 to change when the pressure ratio Pb/P2 obtained by dividing the manifold pressure detection value Pbdt by the supercharging pressure estimation value P2es is smaller than a preliminarily set prohibition pressure ratio, and prohibits the correction value ΔP2 from changing when the pressure ratio Pb/P2 is the same as or larger than the preliminarily set prohibition pressure ratio. The prohibition pressure ratio is preliminarily set to a value that is the same as or larger than 0.8 (0.83, in in this example).

As represented in FIG. 3, in the region where the pressure ratio Pb/P2 is close to 1.0, the dimensionless flow rate σ largely changes when the pressure ration Pb/P2 varies and the value of the dimensionless flow rate σ is small; therefore, the estimation error in the effective opening area estimation value Sthes may largely change when the estimation error in the supercharging pressure estimation value P2es varies. Accordingly, even when the correction of the supercharging pressure estimation value P2es is permitted in the region where the pressure ratio Pb/P2 is close to 1.0, the correction accuracy may be deteriorated or the behavior of the correction value ΔP2 may become unstable. In the foregoing configuration, when the pressure ratio Pb/P2 is the same as or larger than the prohibition pressure ratio, the correction value ΔP2 is prohibited from changing, and when the pressure ratio Pb/P2 is smaller than the prohibition pressure ratio, the correction value ΔP2 is permitted to change; therefore, the correction accuracy for the supercharging pressure estimation value P2es is suppressed from being deteriorated and the behavior of the correction value ΔP2 is suppressed from becoming unstable.

In Embodiment 1, the supercharging pressure estimation unit 74 permits the correction value ΔP2 to change when the supercharging pressure estimation value P2es is set to a weakest-supercharging-state supercharging pressure estimation value P2eswg0, described below, and prohibits the correction value ΔP2 from changing when the supercharging pressure estimation value P2es is set to a normal-supercharging-state supercharging pressure estimation value P2escal, described below.

As described later, when the supercharging pressure estimation value P2es is set to the normal-supercharging-state supercharging pressure estimation value P2escal, the pressure ratio Pb/P2 is within the region close to 1.0; when the supercharging pressure estimation value P2es is set to the weakest-supercharging-state supercharging pressure estimation value P2eswg0, the pressure ratio Pb/P2 is smaller than the region close to 1.0. Accordingly, in the foregoing configuration, the correction accuracy for the supercharging pressure estimation value P2es is suppressed from being deteriorated, and the behavior of the correction value ΔP2 is suppressed from becoming unstable.

The method of estimating the supercharging pressure estimation value P2es according to Embodiment 1 will be explained.

At first, the method of calculating the weakest-supercharging-state supercharging pressure estimation value P2eswg0 will be explained. The controller 1 is provided with an atmospheric pressure detection unit 85 for detecting the atmospheric pressure P1. The atmospheric pressure detection unit 85 detects the atmospheric pressure P1, based on the output signal of the atmospheric pressure sensor 43. The controller 1 is provided with an exhaust gas amount estimation unit 79. The exhaust gas amount estimation unit 79 estimates the exhaust gas amount Qex, based on the intake air amount Qa and the air-fuel ratio AF of the internal combustion engine 10. The exhaust gas amount estimation unit 79 utilizes, as the intake air amount Qa, the intake air amount detection value Qadt, and utilizes, as the air-fuel ratio AF, the air-fuel ratio AF of the exhaust gas, detected based on the output signal of the A/F sensor 45. The exhaust gas amount estimation unit 79 may utilize, as the air-fuel ratio AF, a desired air-fuel ratio to be utilized when the fuel injection amount is determined.

The supercharging pressure estimation unit 74 is provided with a weakest-supercharging-state estimation unit 81. By use of a weakest-supercharging-state supercharging pressure map, which is a map in which as represented by the solid line in FIG. 6, there is preliminarily set the relationship between the exhaust gas amount Qex and the pressure ratio P2/P1 of the supercharging pressure P2 to the atmospheric pressure P1 at a time of the opening degree state (referred to also as the weakest supercharging state), of the wastegate valve 33a, that weakens most the supercharging by the compressor 32b, the weakest-supercharging-state estimation unit 81 estimates the supercharging pressure P2 in the weakest supercharging state, based on an exhaust gas amount estimation value Qexes and an atmospheric pressure detection value P1dt. Specifically, the weakest-supercharging-state estimation unit 81 calculates the pressure ratio P2/P1 corresponding to the exhaust gas amount estimation value Qexes by use of the weakest-supercharging-state supercharging pressure map and multiplies the pressure ratio P2/P1 by the atmospheric pressure detection value P1dt so as to calculate the weakest-supercharging-state supercharging pressure estimation value P2eswg0. In Embodiment 1, the weakest-supercharging-state estimation unit 81 utilizes, as the final weakest-supercharging-state supercharging pressure estimation value P2eswg0, a value obtained by applying first-order lag filtering processing to the weakest-supercharging-state supercharging pressure estimation value P2eswg0. The filter gain in the first-order lag filtering processing is changed depending on the operation state of the internal combustion engine 10 such as the acceleration state or deceleration state, which is determined, for example, based on the temporal transition of the exhaust gas amount Qex. Because the first-order lag filtering processing makes it possible to represent the delay in a transient change of the supercharging pressure P2, the estimation accuracy for the supercharging pressure P2 can be raised.

Figure 6:
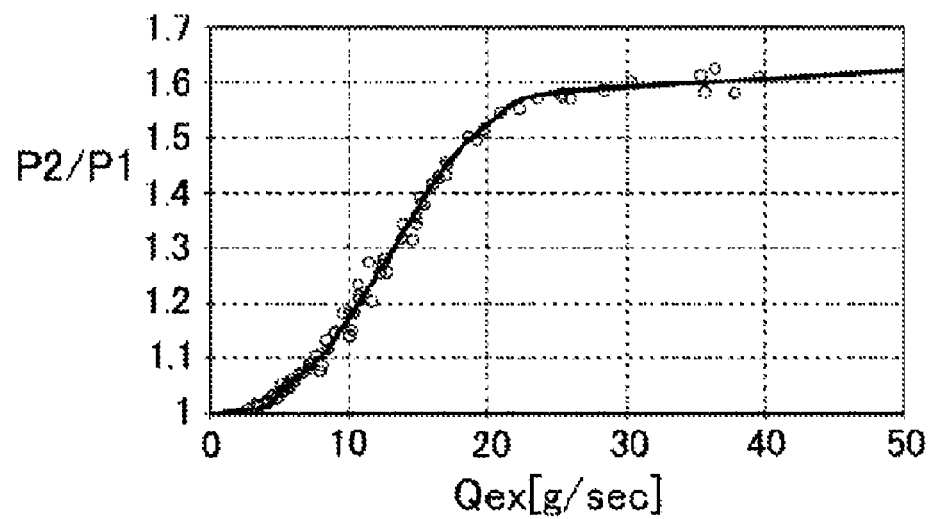
FIG. 6 is a graph representing the relationship between the pressure ratio and the exhaust gas amount according to Embodiment 1 of the present invention.

The supercharging pressure P2 in the weakest supercharging state will be explained. The dot "○" in FIG. 6 is experimental data measured under the driving conditions with a plurality of rotation speeds Ne at a time when the duty ratio of the relief valve 36 of the wastegate actuator 33b is set to 0% so as to minimize the relief amount of the pressure in the pressure chamber and hence the opening degree state of the wastegate valve 33a is set to the one that weakens the supercharging most. Specifically, the pressure ratio P2/P1 of the measurement value of the supercharging pressure P2 to the measurement value of the atmospheric pressure P1 vs. the measurement value of the exhaust gas amount Qex, measured under each of the driving conditions at a time when the opening degree state of the wastegate valve 33a is set to the one that weakens the supercharging most, is plotted by the dot "○". The solid line is the characteristic obtained by averaging the experimental data pieces. A characteristic like this solid line, which has been determined through an experiment is preliminarily set as the foregoing weakest-supercharging-state supercharging pressure map. This experimental data suggests that in the weakest supercharging state, the pressure ratio P2/P1 of the supercharging pressure P2 to the atmospheric pressure P1 can be estimated based on the exhaust gas amount Qex and that the supercharging pressure P2 can be estimated by multiplying the pressure ratio P2/P1 by the atmospheric pressure P1. On a flatland whose elevation is almost the sea level, the atmospheric pressure P1 is approximately 101.3 kPa; however, on a highland whose elevation is 2500 m, the atmospheric pressure P1 changes up to 75 kPa. In order to accurately estimate the supercharging pressure P2 even in a highland environment, it is required to utilize the pressure ratio P2/P1 of the supercharging pressure P2 to the atmospheric pressure P1.

Next, the method of calculating the normal-supercharging-state supercharging pressure estimation value P2escal will be explained. The controller 1 is provided with a rotation speed detection unit 84 for detecting the rotation speed Ne of the internal combustion engine 10. The rotation speed detection unit 84 detects the rotation speed Ne, based on the output signal of the crank rotation speed sensor 40. The supercharging pressure estimation unit 74 is provided with an opening area default value calculation unit 80 and a normal-supercharging-state estimation unit 82. By use of the opening area default value map, as represented in FIG. 4, in which the relationship between the throttle opening degree TP and the effective opening area default value Sthdf is preliminarily set, the opening area default value calculation unit 80 calculates an estimation-purpose opening area Sthtp, which is the effective opening area Sth corresponding to the throttle opening degree detection value TPdt. In Embodiment 1, the opening area default value calculation unit 80 calculates the estimation-purpose opening area Sthtp corresponding to a throttle opening degree (=TPdt+ΔTPeslrn) obtained by correcting the throttle opening degree detection value TPdt by the estimation throttle opening degree difference learning value ΔTPeslrn.

Figure 7:
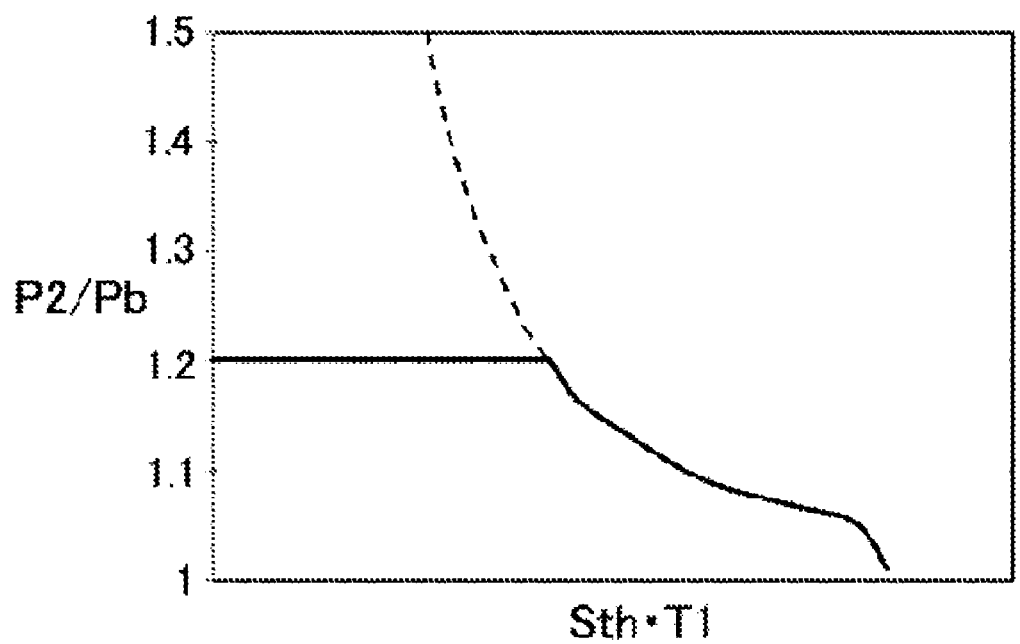
FIG. 7 is a graph representing the relationship between the pressure ratio and the value of multiplication of the effective opening area by the crank rotation cycle according to Embodiment 1 of the present invention.

By use of a normal-supercharging-state supercharging pressure map, as represented by the solid line in FIG. 7, in which the relationship between the value of the multiplication of the effective opening area Sth and the reciprocal (a crank rotation cycle T1, in this example) of the rotation speed Ne and the pressure ratio P2/Pb of the supercharging pressure P2 to the manifold pressure Pb is preliminarily set, the normal-supercharging-state estimation unit 82 calculates the supercharging pressure P2 in the normal supercharging state, based on the estimation-purpose opening area Sthtp, the rotation speed detection value Nedt, and the manifold pressure detection value Pbdt. Specifically, the normal-supercharging-state estimation unit 82 calculates the pressure ratio P2/P1 corresponding to the value of the multiplication of the estimation-purpose opening area Sthtp and the crank rotation cycle T1 by use of the normal-supercharging-state supercharging pressure map and then multiplies the pressure ratio P2/P1 by the manifold pressure detection value Pbdt so as to calculate the normal-supercharging-state supercharging pressure estimation value P2escal. In this situation, the crank rotation cycle T1 is calculated by dividing a preliminarily set conversion coefficient by the rotation speed detection value Nedt.

Figure 8:
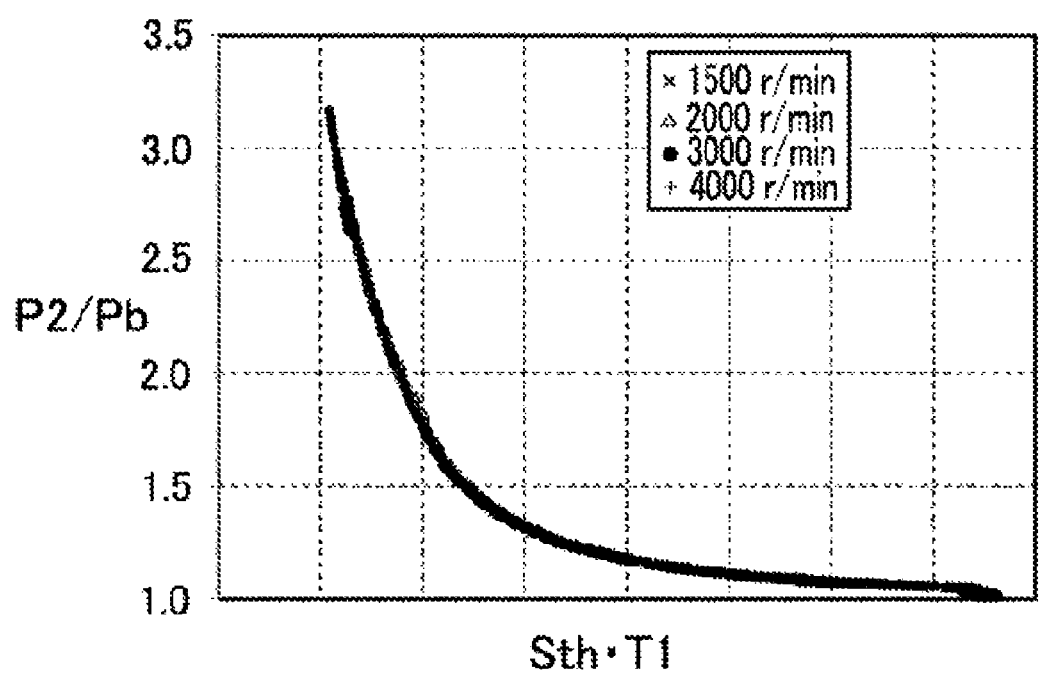
FIG. 8 is a graph representing the relationship between the pressure ratio and the value of multiplication of the effective opening area by the crank rotation cycle according to Embodiment 1 of the present invention.

The supercharging pressure P2 in the normal supercharging state will be explained. FIG. 8 is experimental data measured under the driving conditions with a plurality of rotation speeds Ne at a time when the duty ratio of the relief valve 36 of the wastegate actuator 33b is set to one of various values the same as or larger than 0% so as to set the opening degree of the wastegate valve 33a to the one that causes supercharging the same as or larger than the weakest supercharging. Specifically, the respective pressure ratios P2/P1 of the measurement values of the supercharging pressures P2 to the measurement values of the atmospheric pressures P1 vs. the values of multiplications of the measurement values of the effective opening areas Sth and the measurement values of the crank rotation cycles T1, measured under the driving condition with various duty ratios of the relief valve 36, are plotted by marks that differ depending on the rotation speeds Ne. The experimental data suggests that regardless of changes in the duty ratio of the relief valve 36 and the rotation speed Ne, the pressure ratio P2/Pb of the supercharging pressure P2 to the manifold pressure Pb can be estimated by use of the value of multiplication of the effective opening area Sth and the crank rotation cycle T1 and that the supercharging pressure P2 can be estimated by multiplying the pressure ratio P2/Pb by the manifold pressure Pb.

The above description can theoretically be explained as follows. The intake air amount Qa (volume flow rate) can be calculated also by the equation (7).

$$Qa = \frac{V2}{T1} \qquad (7)$$

where V2 [L] is the volume of intake air that passes through the throttle valve 23 during the crank rotation cycle T1.

when the volume of intake air, on the basis of the intake manifold 22, that is taken into the combustion chamber 11 during the crank rotation cycle T1 is expressed by the value of multiplication of the volumetric efficiency Kv and the combustion chamber volume Vc, the volume flow rate Qac that is taken into the combustion chamber 11 can be calculated by the equation (8).

$$Qac = \frac{Kv \cdot Vc}{T1} \qquad (8)$$

In the normal driving state, the respective mass flow rate conversion values of the intake air amount Qa and the combustion chamber intake air amount Qac are equal to each other; when it is assumed that the respective intake air temperatures at the upstream and downstream sides of the throttle valve 23 are equal to each other, the equation (9) is derived from the equations (7) and (8).

$$P2 \cdot V2 = Pb \cdot Kv \cdot Vc \qquad (9)$$

$$V2 = \frac{Pb}{P2} \cdot Kv \cdot Vc$$

Furthermore, the equation (10) is derived from the equations (2), (7), and (9).

$$Sth = \frac{Qa}{a0 \cdot \sigma} = \frac{V2}{a0 \cdot \sigma \cdot T1} = \frac{Kv \cdot Vc}{a0 \cdot \sigma \cdot T1} \cdot \frac{Pb}{P2} \qquad (10)$$

In this situation, because the dimensionless flow rate 6 is also a function of the pressure ratio Pb/P2; thus, by rearranging the equation (10), the equation (11) can be given.

$$f\left(\frac{Pb}{P2}\right) = \frac{Sth \cdot T1 \cdot a0}{Kv \cdot Vc} \text{ or } \frac{Pb}{P2} = f\left(\frac{Sth \cdot T1 \cdot a0}{Kv \cdot Vc}\right) \qquad (11)$$

In the equation (11), the combustion chamber volume Vc is a constant; thus, when the change in the volumetric efficiency Kv and the sonic velocity a0 are small, the equation (11) can be rearranged into the equation (12).

$$\frac{Pb}{P2} = f(Sth \cdot T1) \qquad (12)$$

Therefore, it can theoretically be explained that the pressure ratio Pb/P2 can be estimated by use of the value of multiplication of the effective opening area Sth and the crank rotation cycle T1.

Figure 9:
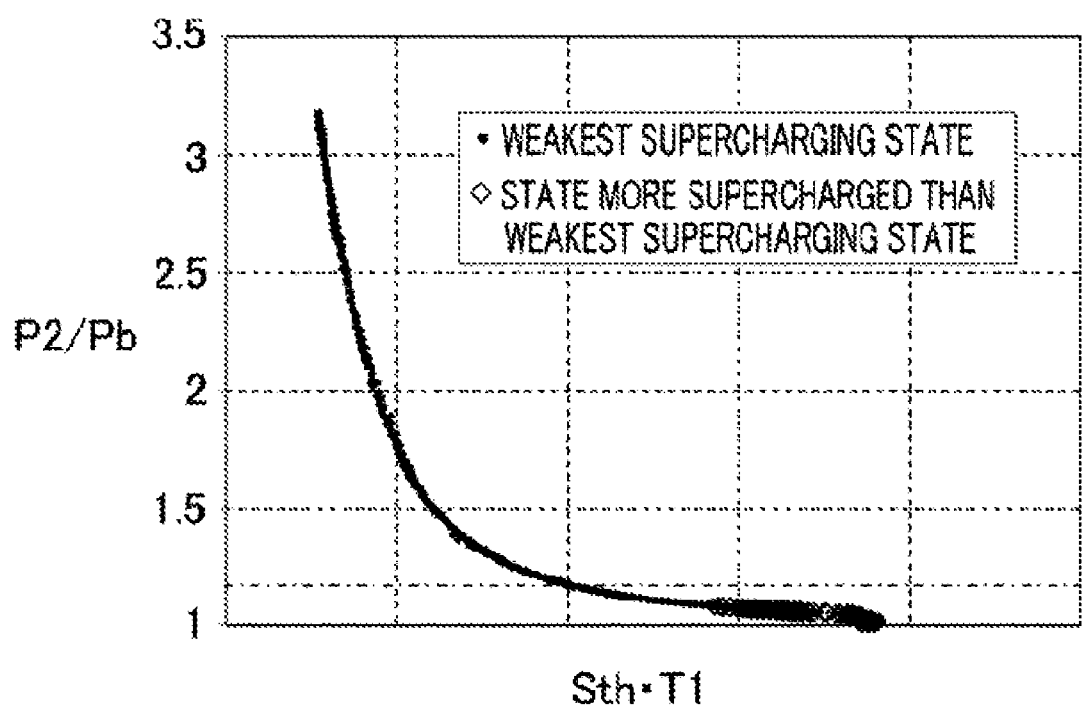
FIG. 9 is a graph representing the relationship between the pressure ratio and the value of multiplication of the effective opening area by the crank rotation cycle according to Embodiment 1 of the present invention.

FIG. 9 represents the relevance between the respective characteristics shown in FIGS. 8 and 6. In FIG. 9, the experimental data at a time when the opening degree of the wastegate valve 33a is set to the one that weakens the supercharging most is represented by the mark "•", and the data at a time when the opening degree of the wastegate valve 33a is set to the one that causes supercharging lager than the weakest supercharging is represented by the mark "◊". As can be seen from FIG. 9, the region where the pressure ratio P2/Pb is larger than approximately 1.2 (the region where the pressure ratio Pb/P2 is smaller than approximately 0.83) represents the case where the opening degree of the wastegate valve 33a is set to the one that weakens the supercharging most and hence, by use of the characteristic in FIG. 6, the supercharging pressure P2 can be estimated based on the exhaust gas amount Qex. Because in the region where the pressure ratio P2/Pb is large, the change in the pressure ratio P2/Pb vs. the change in the value of multiplication of the effective opening area Sth and the crank rotation cycle T1 becomes large, adverse effects on the stability of the supercharging pressure estimation value P2es are worried.

Accordingly, the supercharging pressure estimation unit 74 calculates the supercharging pressure estimation value P2es by use of the characteristic in FIG. 6 for the region where the pressure ratio P2/Pb is larger than approximately 1.2 (the region where the pressure ratio Pb/P2 is smaller than approximately 0.83), and calculates the supercharging pressure estimation value P2es by use of the characteristic in FIG. 8 for the region where the pressure ratio P2/Pb is smaller than approximately 1.2 (the region where the pressure ratio Pb/P2 is larger than approximately 0.83). Specifically, the supercharging pressure estimation unit 74 sets the supercharging pressure estimation value P2es to the weakest-supercharging-state supercharging pressure estimation value P2eswg0 when the pressure ratio Pb/P2 obtained by dividing the manifold pressure detection value Pbdt by the supercharging pressure estimation value P2es is smaller than a preliminarily set switching pressure ratio, and sets the supercharging pressure estimation value P2es to the normal-supercharging-state supercharging pressure estimation value P2escal when the pressure ratio Pb/P2 is the same as or larger than the switching pressure ratio. The switching pressure ratio is preliminarily set to a value the same as or larger than 0.8 (0.83, in this example); in Embodiment 1, the switching pressure ratio is set to a value the same as that of the foregoing prohibition pressure ratio.

In Embodiment 1, as represented in FIG. 7, data in which the maximum value of the pressure ratio P2/Pb is limited to the reciprocal (1.2, in this example) of the switching pressure ratio is preliminarily set; in the case where the pressure ratio Pb/P2 is smaller than the switching pressure ratio, the weakest-supercharging-state supercharging pressure estimation value P2eswg0 becomes larger than the normal-supercharging-state supercharging pressure estimation value P2escal. Thus, the supercharging pressure estimation unit 74 sets the supercharging pressure estimation value P2es to the value of any larger one out of the weakest-supercharging-state supercharging pressure estimation value P2eswg0 and the normal-supercharging-state supercharging pressure estimation value P2escal.

Figure 10:
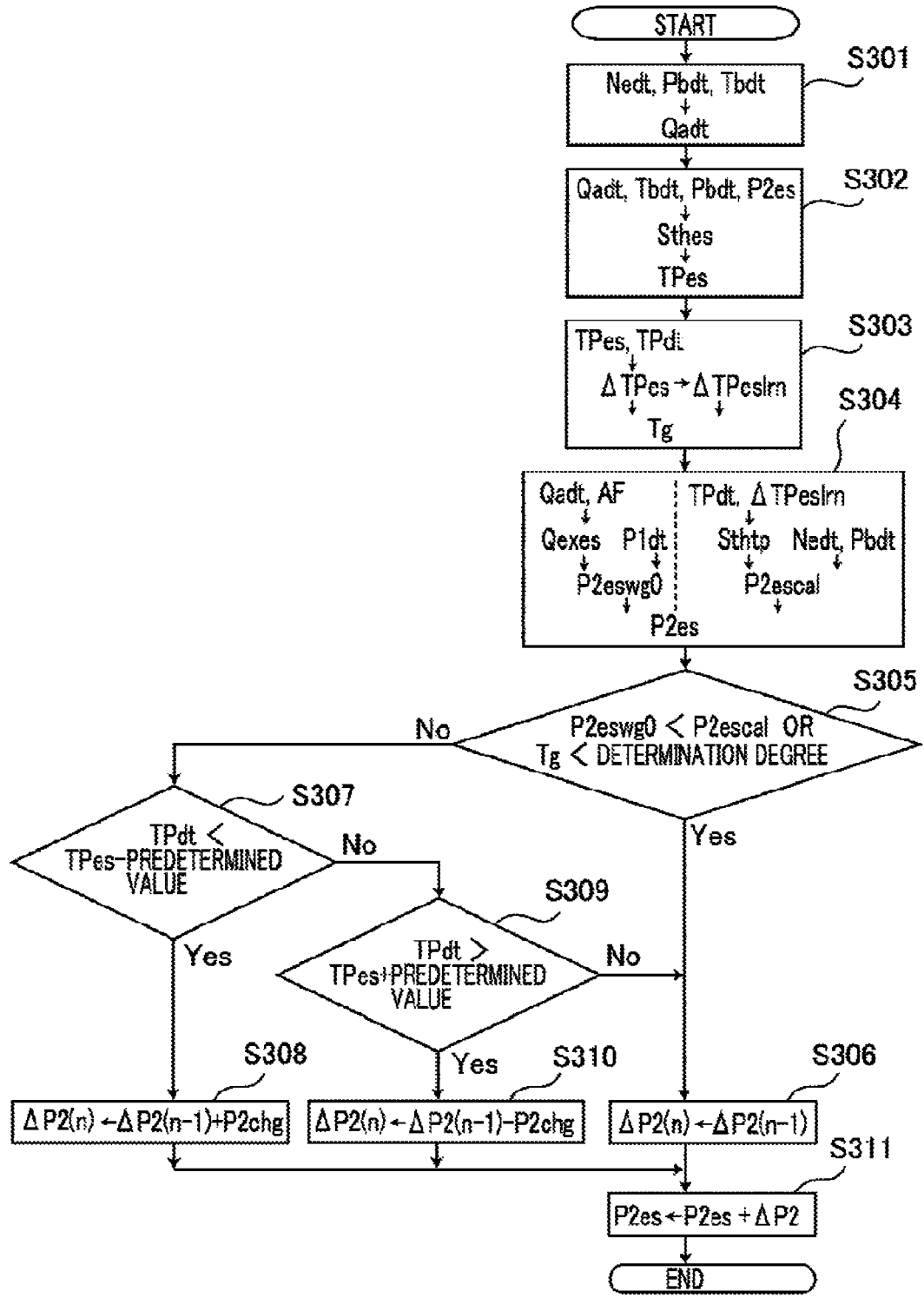
FIG. 10 is a flowchart representing the processing by the controller according to Embodiment 1 of the present invention.

The foregoing processing by the controller 1 can be configured in such a manner as represented in the flowchart of FIG. 10. The processing represented in the flowchart in FIG. 10 is recurrently executed every constant operation cycle by the computing processing unit 90 executing software (a program) stored in the storage apparatus 91.

At first, in the step S301, the intake air amount detection unit 71 detects the intake air amount Qa of the internal combustion engine 10. In Embodiment 1, the intake air amount detection unit 71 detects the intake air amount Qa, based on the manifold pressure detection value Pbdt, the rotation speed detection value Nedt of the internal combustion engine 10, and the intake air temperature detection value Tbdt.

Next, in the step S302, the opening area estimation unit estimates the effective opening area Sth of the throttle valve 23, based on the supercharging pressure estimation value P2es, the manifold pressure detection value Pbdt, the intake air amount detection value Qadt, and the intake air temperature detection value Tbdt. The estimation throttle opening degree calculation unit 77 calculated the estimation throttle opening degree TPes, which is the throttle opening degree TP corresponding to the effective opening area estimation value Sthes, by use of the opening area default value map.

Next, in the step S303, the opening degree difference learning value calculation unit 78 calculates the estimation throttle opening degree difference learning value ΔTPeslrn, which is a value obtained by applying averaging processing to the estimation throttle opening degree difference ΔTPes, which is the difference between the estimation throttle opening degree TPes and the throttle opening degree detection value TPdt (the desired throttle opening degree, in this example). Then, the variation calculation unit 76 calculates the variation degree Tg of the estimation throttle opening degree difference ΔTPes, which is the difference between the estimation throttle opening degree TPes and the throttle opening degree detection value TPdt, to the estimation throttle opening degree difference learning value ΔTPeslrn.

Next, in the step S304, the exhaust gas amount estimation unit 79 estimates the exhaust gas amount Qex, based on the intake air amount Qa and the air-fuel ratio AF of the internal combustion engine 10. Then, by use of the weakest-supercharging-state supercharging pressure map, the weakest-supercharging-state estimation unit 81 estimates the supercharging pressure P2 in the weakest supercharging state, based on the exhaust gas amount estimation value Qexes and the atmospheric pressure detection value Pldt. By use of the opening area default value map, the opening area default value calculation unit 80 calculates the estimation-purpose opening area Sthtp corresponding to the throttle opening degree obtained by correcting the throttle opening degree detection value TPdt by the estimation throttle opening degree difference learning value ΔTPeslrn. By use of the normal-supercharging-state supercharging pressure map, the normal-supercharging-state estimation unit 82 estimates the supercharging pressure P2 in the normal supercharging state, based on the estimation-purpose opening area Sthtp, the rotation speed detection value Nedt, and the manifold pressure detection value Pbdt. The supercharging pressure estimation unit 74 sets the supercharging pressure estimation value P2es to the value of any larger one out of the weakest-supercharging-state supercharging pressure estimation value P2eswg0 and the normal-supercharging-state supercharging pressure estimation value P2escal.

In the step S305, in the case where the variation degree Tg is smaller than the determination degree or in the case where the weakest-supercharging-state supercharging pressure estimation value P2eswg0 is smaller than the normal-supercharging-state supercharging pressure estimation value P2escal (in the step S305: Yes), the correction value calculation unit 83 prohibits the correction value ΔP2 from changing; then, in the step S306, the correction value calculation unit 83 does not change but holds the correction value ΔP2. In contrast, in the case where the variation degree Tg is the same as or larger than the determination degree and the weakest-supercharging-state supercharging pressure estimation value P2eswg0 is the same as or larger than the normal-supercharging-state supercharging pressure estimation value P2escal (in the step S305: No), the correction value calculation unit 83 advances to the step S307.

When determining in the step S307 that the throttle opening degree detection value TPdt is smaller than a prohibition lower limit value obtained by subtracting a predetermined value from the estimation throttle opening degree TPes (in the step S307: Yes), the correction value calculation unit 83 increases the correction value ΔP2 by the changing amount P2chg in the step S308. on the other hand, when determining that the throttle opening degree detection value TPdt is the same as or larger than the prohibition lower limit value (in the step S307: No) and determining in the step S309 that the throttle opening degree detection value TPdt is larger than a prohibition upper limit value obtained by adding a predetermined value to the estimation throttle opening degree TPes (in the step S309: Yes), the correction value calculation unit 83 decreases the correction value ΔP2 by the changing amount P2chg in the step S310. In contrast, when determining that the throttle opening degree detection value TPdt is the same as or larger than the prohibition lower limit value (in the step S307: No) and determining that the throttle opening degree detection value TPdt is the same as or smaller than the prohibition upper limit value obtained by adding the predetermined value to the estimation throttle opening degree TPes (in the step S309: No), the correction value calculation unit 83 prohibits the correction value ΔP2 from changing; then, in the step S306, the correction value calculation unit 83 does not change but holds the correction value ΔP2.

Then, in the step S311, the supercharging pressure estimation unit 74 sets the final supercharging pressure estimation value P2es to a value obtained by correcting the supercharging pressure estimation value P2es calculated in the step S304 by the correction value ΔP2.

Other Embodiments

Lastly, other embodiments of the present invention will be explained. Each of the configurations of embodiments to be explained below is not limited to be separately utilized but can be utilized in combination with the configurations of other embodiments as long as no discrepancy occurs.

(1) In Embodiment 1, there has been explained a case where the estimation throttle opening degree calculation unit 77 calculates the estimation throttle opening degree TPes, which is the throttle opening degree TP corresponding to the effective opening area estimation value Sthes, by use of the opening area default value map, and the correction value calculation unit 83 changes the correction value ΔP2 in such a way that the estimation throttle opening degree TPes approaches the throttle opening degree detection value TPdt, so that an estimation error in the effective opening area Sth is converted into an error based on the throttle opening degree and the correction value ΔP2 is changed in such a way that, indirectly, the effective opening area estimation value Sthes approaches the effective opening area default value Sthdf corresponding to the throttle opening degree detection value TPdt. However, it may be allowed that the supercharging pressure estimation unit 74 actually calculates the effective opening area default value Sthdf corresponding to the throttle opening degree detection value TPdt by use of the opening area default value map, and changes the correction value ΔP2 in such a way that, directly, the effective opening area estimation value Sthes approaches the calculated effective opening area default value Sthdf by the error based on the effective opening area.

(2) In Embodiment 1, there has been explained a case where the correction value calculation unit 83 permits the correction value ΔP2 to change when the throttle opening degree detection value TPdt is out of the prohibition opening degree range Rtp including the estimation throttle opening degree TPes and prohibits the correction value ΔP2 from changing when the throttle opening degree detection value TPdt is within the prohibition opening degree range Rtp. However, it may be allowed that the correction value calculation unit 83 does not perform the prohibition determination, utilizing the prohibition opening degree range Rtp, but permits the correction value ΔP2 to change regardless of whether or not the throttle opening degree detection value TPdt is within the prohibition opening degree range Rtp.

(3) In Embodiment 1, there has been explained a case where the supercharging pressure estimation unit 74 permits the correction value ΔP2 to change when the variation degree is the same as or larger than a determination degree, and prohibits the correction value ΔP2 from changing when the variation degree is smaller than the determination degree. However, it may be allowed that the supercharging pressure estimation unit 74 does not perform the prohibition determination utilizing the variation degree but permits the correction value ΔP2 to change regardless of whether the variation degree is the same as or larger than the determination degree or smaller than the determination degree.

(4) In Embodiment 1, there has been explained a case where the supercharging pressure estimation unit 74 permits the correction value ΔP2 to change when the pressure ratio Pb/P2 obtained by dividing the manifold pressure detection value Pbdt by the supercharging pressure estimation value P2es is smaller than a prohibition pressure ratio, and prohibits the correction value ΔP2 from changing when the pressure ratio Pb/P2 is the same as or larger than the prohibition pressure ratio. However, it may be allowed that the supercharging pressure estimation unit 74 does not perform the prohibition determination utilizing the pressure ratio Pb/P2 but permits the correction value ΔP2 to change regardless of whether the pressure ratio Pb/P2 is the same as or larger than the prohibition pressure ratio or smaller than the prohibition pressure ratio.

(5) In Embodiment 1, there has been explained a case where the correction value calculation unit 83 increases or decreases the correction value ΔP2 by the preliminarily set changing amount P2chg. However, it may be allowed that the correction value calculation unit 83 changes the correction value ΔP2 by any arbitrary method as long as the correction value ΔP2 is changed in such a way that the estimation throttle opening degree TPes approaches the throttle opening degree detection value TPdt. For example, it may be allowed that the correction value calculation unit 83 changes the value of the changing amount P2chg in accordance with the estimation throttle opening degree difference ΔTPes, which is the difference between the estimation throttle opening degree TPes and the throttle opening degree detection value TPdt, or that the correction value calculation unit 83 changes the correction value ΔP2 through a proportional calculation or an integral calculation based on the estimation throttle opening degree difference ΔTPes.

(6) In Embodiment 1, there has been explained a case where the supercharging pressure estimation unit 74 estimates a weakest-supercharging-state supercharging pressure and a normal-supercharging-state supercharging pressure and then sets the final supercharging pressure estimation value to any one of the estimated values. However, it may be allowed that the supercharging pressure estimation unit 74 estimates the supercharging pressure P2 through any arbitrary estimation method, for example, a method of estimating only the normal-supercharging-state supercharging pressure and setting the supercharging pressure estimation value P2es to the estimated normal-supercharging-state supercharging pressure.

In the scope of the present invention, the embodiments thereof can appropriately be modified or omitted.

What is claimed is:

1. A controller that controls an internal combustion engine equipped with a supercharger having a turbine provided in an exhaust path, a compressor that is provided at an upstream side of a throttle valve in an intake path and rotates integrally with the turbine, and a wastegate valve provided in a turbine bypass path, of the exhaust path, that bypasses the turbine, the controller comprising:
  a throttle opening degree detector that detects a throttle opening degree, which is an opening degree of the throttle valve;
  an intake air amount detector that detects an intake air amount of the internal combustion engine;
  an intake air temperature detector that detects an intake air temperature, which is a temperature of intake air of the internal combustion engine;
  a manifold pressure detector that detects a manifold pressure, which is a pressure in an intake manifold as the intake path provided at a downstream side of the throttle valve;
  a supercharging pressure estimator that estimates a supercharging pressure, which is a pressure in the intake path provided at the downstream side of the compressor and at the upstream side of the throttle valve; and
  an opening area estimator that estimates an effective opening area of the throttle valve, based on the estimated supercharging pressure, the detected manifold pressure, the detected intake air amount, and the detected intake air temperature,
  wherein the supercharging pressure estimator changes a correction value for correcting the estimated supercharging pressure so that the estimated effective opening area approaches a preliminarily set effective opening area default value corresponding to the detected throttle opening degree, and adopts a value corrected by the correction value, as a final supercharging pressure estimation value.

2. The controller according to claim 1, further comprising a variation calculator that calculates a variation degree of an estimation opening area difference, from an average value of the estimation opening area difference, that is a difference between the estimated effective opening area and the effective opening area default value corresponding to the detected throttle opening degree,
  wherein the supercharging pressure estimator permits the correction value to change when the variation degree is greater than or equal to a preliminarily set determination degree, and prohibits the correction value from changing when the variation degree is less than the preliminarily set determination degree.

3. The controller according to claim 1, wherein the supercharging pressure estimator permits the correction value to change when a pressure ratio obtained by dividing the estimated supercharging pressure by the detected manifold pressure is greater than a preliminarily set determination pressure ratio, and prohibits the correction value from changing when the pressure ratio is less than the preliminarily set determination pressure ratio.

4. The controller according to claim 1, wherein when the estimated effective opening area is greater than the effective opening area default value, the supercharging pressure estimator increases the correction value so as to increase the corrected estimated supercharging pressure, and when the estimated effective opening area is less than the effective opening area default value, the supercharging pressure estimator decreases the correction value so as to decrease the corrected estimated supercharging pressure.

5. The controller according to claim 1, further comprising an estimation throttle opening degree calculator that calculates an estimation throttle opening degree, which is the throttle opening degree corresponding to the estimated effective opening area, by use of an opening area default value map, which is a map in which a relationship between the throttle opening degree and the effective opening area default value is preliminarily set,
  wherein the supercharging pressure estimator changes the correction value so that the estimation throttle opening degree approaches the detected throttle opening degree.

6. The controller according to claim 5, wherein when the detected throttle opening degree is less than the estimation throttle opening degree, the supercharging pressure estimator increases the correction value so as to increase the corrected estimated supercharging pressure, and when the detected throttle opening degree is greater than the estimation throttle opening degree, the supercharging pressure estimator decreases the correction value so as to decrease the corrected estimated supercharging pressure.

7. The controller according to claim 5, wherein the supercharging pressure estimator permits the correction value to change when the detected throttle opening degree is out of a preliminarily set prohibition opening degree range including the estimation throttle opening degree, and prohibits the correction value from changing when the detected throttle opening degree is within the prohibition opening degree range.

8. The controller according to claim 5, further comprising a variation calculator that calculates a variation degree of an estimation throttle opening degree difference, which is a difference between the estimation throttle opening degree and the detected throttle opening degree, with respect to an average value of the estimation throttle opening degree difference,
  wherein the supercharging pressure estimator permits the correction value to change when the variation degree is greater than or equal to a preliminarily set determination degree, and prohibits the correction value from changing when the variation degree is less than the determination degree.

9. The controller according to claim 1, further comprising:
  an atmospheric pressure detector that detects an atmospheric pressure;
  a rotation speed detector that detects a rotation speed of the internal combustion engine;
  an exhaust gas amount estimator that estimates an exhaust gas amount, based on the intake air amount and an air-fuel ratio in the internal combustion engine; and
  an opening area default value calculator that calculates an estimation-purpose opening area, which is the effective opening area corresponding to the detected throttle opening degree, by use of an opening area default value map, which is a map in which a relationship between the detected throttle opening degree and the effective opening area default value is preliminarily set, wherein by use of a weakest-supercharging-state supercharging pressure map, which is a map in which there is preliminarily set a relationship between the exhaust gas amount and a pressure ratio of the supercharging pressure in an opening degree state, of the wastegate valve, that mostly weakens supercharging by the compressor to the atmospheric pressure, the supercharging pressure estimator estimates the supercharging pressure in a weakest supercharging state, based on the estimated exhaust gas amount and the detected atmospheric pressure, wherein by use of a normal-supercharging-state supercharging pressure map, which is a map in which a relationship between a value of a multiplication of the effective opening area and a reciprocal of the rotation speed and the pressure ratio of the supercharging pressure to the manifold pressure is preliminarily set, the supercharging pressure estimator calculates the supercharging pressure in a normal supercharging state, based on the estimation-purpose opening area, the detected rotation speed, and the detected manifold pressure, and wherein the supercharging pressure estimator calculates, as the estimated supercharging pressure, a weakest-supercharging-state supercharging pressure estimation value when the pressure ratio obtained by dividing the detected manifold pressure by the estimated supercharging pressure is less than a preliminarily set switching pressure ratio, and calculates, as the estimated supercharging pressure, a normal-supercharging-state supercharging pressure estimation value when the pressure ratio is greater than or equal to the preliminarily set switching pressure ratio.

10. The controller according to claim 9, further comprising:

an estimation throttle opening degree calculator that calculates an estimation throttle opening degree, which is the throttle opening degree corresponding to the estimated effective opening area, by use of the opening area default value map; and an opening degree difference learning value calculator that calculates an estimation throttle opening degree difference learning value, which is a value obtained by applying averaging processing to the difference between the estimation throttle opening degree and the detected throttle opening degree, wherein by use of the opening area default value map, the opening area default value calculator calculates, as the estimation-purpose opening area, the effective opening area corresponding to a throttle opening degree obtained by correcting the detected throttle opening degree by the estimation throttle opening degree difference learning value.

11. The controller according to claim 9, wherein the supercharging pressure estimator adopts, as a final weakest-supercharging-state supercharging pressure estimation value, a value obtained by applying first-order lag filtering processing to the weakest-supercharging-state supercharging pressure estimation value.

\* \* \* \* \*